United States Patent Office 2,765,241
Patented Oct. 2, 1956

2,765,241

POLYTETRAFLUOROETHYLENE FILMS AND COATED FABRICS WITH PRESSURE SENSITIVE ADHESIVE ON ONE SIDE THEREOF AND METHOD OF MAKING

Winston Joe Wayne, Wilmington, Del., assignor to E. I. du Pont de Nemours & Company, Wilmington, Del., a corporation of Delaware No Drawing. Application June 5, 1952,
Serial No. 291,972

7 Claims. (Cl. 117—76)

This invention relates to polytetrafluoroethylene films and coated fabrics with pressure sensitive adhesive on one side thereof.

The unctuous character of polytetrafluoroethylene makes it useful in a great many applications where it is desired that it not stick to itself or other materials. However, in certain applications, it is desired to adhere polytetrafluoroethylene to itself or other solid surfaces.

In the process of insulating electrical cables by wrapping the cable with polytetrafluoroethylene coated glass fabric or unsupported film in the form of tape, it has been a problem to hold the tape in place after spirally wrapping and before fusing to form an integral sheath. It is well known that polytetrafluoroethylene has high dielectric strength and when other materials are incorporated with it in an electrical insulation system the dielectric strength per unit thickness of insulation is usually decreased considerably. Heretofore there have been no known pressure sensitive adhesives for polytetrafluoroethylene which have as high dielectric strength as polytetrafluoroethylene and, when prior art adhesives have been employed to hold the polytetrafluoroethylene cable wrap in place prior to fusing to form an integral sheath, the dielectric strength has been decreased per unit thickness of insulation.

This invention has as an object the bonding of polytetrafluoroethylene coated fabric and unsupported film to itself or other surfaces. A further object is the provision of a polytetrafluoroethylene unsupported film and coated glass fabric with a pressure sensitive adhesive on one side. A still further object is the provision of a method of adhering a polytetrafluoroethylene coated fabric and unsupported film to itself or other surfaces by means of a pressure sensitive adhesive. A still further object is the provision of a polytetrafluoroethylene sheet material with a pressure sensitive adhesive on one side which, when heated sufficiently, the adhesive will volatilize, leaving substantialy no residue.

These and other important objects are accomplished according to this invention by applying a sticky polymer of isobutylene to at least one side of polytetrafluoroethylene coated glass fabric or unsupported film, the sticky polymer of isobutylene being characterized by having the property of depolymerizing at elevated temperatures to volatile products and evaporating without leaving any substantial residue.

*Example I*

A woven glass fabric identified as Owens-Corning Fiberglas Corporation's ECC 108 having the following specification:

Thickness, mils _____ 2.0
Yarn size _____ 900—1/2
Thread count _____ 60 × 47
Ounces per sq. yd. _____ 1.43 was given three dip coats of the following composition:

Percent by weight
Finely divided polytetrafluoroethylene _____ 46.0
Wetting agent _____ 6.0
Water _____ 48.0

After each successive dip coat, the coated glass fabric was passed through a graduated heat zone to evaporate the water and then fuse or sinter the coating. In order to fuse or sinter the coating it must be heated to at least 621° F. The weight of dry coating deposited in the three dip coats was about 3.0 ounces per square yard and the total thickness of the dry coated fabric was about 3.0 mils.

The coated and fused glass fabric was slit into ½" width tape and the tape was further coated on one side with the following composition:

Percent by weight
Polyisobutylene ("Vistanex" LM Type H) _____ 50.0
Toluene _____ 50.0

After evaporation of the toluene from the coated tape, a sticky pressure sensitive adhesive remained on the surface. A ¼ inch diameter aluminum rod was spirally wrapped with a 50% overlap of the tape. The side of the tape with pressure sensitive adhesive was toward the metal rod. The tape adhered to the aluminum rod and there was no slippage or telescoping of the tape as was encountered when the rod was wrapped with a polytetrafluoroethylene coated glass fabric tape without the pressure sensitive adhesive on one side.

The wrapped rod was next subjected to an air temperature sufficiently high to heat the polytetrafluoroethylene to at least 621° F. At this temperature the polyisobutylene adhesive was depolymerized and volatilized, leaving substantially no residue. The spirally wrapped tape was fused into an integral sheath and there was no reduction in the dielectric strength per unit of thickness of insulation as compared to a similarly insulated rod without employing an evanescent adhesive.

*Example II*

To test the adhesive strength between two plies of the pressure sensitive adhesive tape described in Example I, two one-inch strips were adhered together by hand pressing the two strips together with the adhesive on one strip contacting the adhesive on the other strip.

A pull of 2.5 pounds was required to pull the two plies apart. The adhesion test was carried out in accordance with the method described in Federal Specification CCC–T–191b dated May 15, 1951, Method 5950, except strips one inch wide were employed instead of strips two inches wide.

*Example III*

An unsupported film of polytetrafluoroethylene nine mils thick was coated with one coat of the adhesive composition of Example I. The adhesive coated side of the film was hand pressed against a glass fabric identified as Owens-Corning Fiberglas Corporation's ECC 138 which had the following specification:

Thickness, mils _____ 7.0
Yarn size _____ 450—2/2
Thread count _____ 64 × 60
Ounces per sq. yd. _____ 6.7

The adhesion between the polytetrafluoroethylene unsupported film and the glass fabric was measured in the same manner as described in Example I and was found to be 2.5 lbs./1" width of sample tested.

The product was adapted for slitting into narrow strips to form cable wrapping for electrical insulating tape with high tear and tensile strength.

Example IV

An unsupported film of polytetrafluoroethylene was coated on one side with a solution of a polyisobutylene in xylene. The polyisobutylene is obtainable on the open market under the designation of "Vistanex B-60." The coating was allowed to air dry at room temperature for 24 hours. The dried coating was very tacky. The coated film was doubled upon itself with the coated surface on the inside and pressed between heated (518 to 536° F.) plates for several seconds. After cooling to room temperature the bond formed between the two plies of polytetrafluoroethylene was tested by hand peeling and found to be satisfactory for many applications, where relatively strong bonds are not required.

Example V

A cable wrap may be prepared by coating and/or impregnating a glass fabric with a polytetrafluoroethylene composition as described in Example I. The treated fabric is heated sufficiently to evaporate the water and not sinter or fuse the polytetrafluoroethylene. A polyisobutylene coating similar to that described in Example I is applied to one side of the dry unfused coating and then wrapped around an electrical cable to be insulated. After spirally wrapping the cable with a 50% overlap the wrapped cable is subjected to a gradated heat zone which depolymerizes and volatilizes the polyisobutylene and sinters the coating to form an integral sheath around the cable. It is necessary that the cable wrapping be heated above 621° F. to sinter the coating and cause it to fuse together.

The non-liquid polyisobutylenes obtainable on the open market under the designations "Vistanex" LM; Types S (soft), MS (medium soft), MH (medium hard) and H (hard) are preferred. These grades are the lowest molecular weight types and have the greatest evanescence. Other grades of higher molecular weight, known as "Vistanex" MM; Types B-40, B-60, B-80, B-100, B-120 and B-140 are also useful in carrying out the applicant's invention. The higher the molecular weight the greater the heat required for complete dissipation of the tacky adhesive. The useful isobutylene polymers are the low molecular weight sticky polymers and those having a molecular weight of about 10,000 up to 140,000. In the case of the higher molecular weight polymers based on isobutylene it is sometimes desirable to blend them with the low molecular weight polymers to obtain the optimum degree of adhesiveness. The liquid butylene polymers are particularly suitable for blending with the solid polymers based on isobutylene to obtain the optimum pressure sensitive adhesiveness. These polymers will degrade or depolymerize to volatile products when heated from 450 to 650° F. without causing decomposition of the polytetrafluoroethylene.

In place of woven glass fabric disclosed in the specific examples, non-woven glass fabrics may be used as well as other heat resistant inorganic fabrics, such as, e. g. woven metal wire and asbestos fabric. The heat resistant polyacrylonitrile fabrics disclosed in copending applications S. N. 706,515 filed October 29, 1946, and S. N. 263,500 filed December 26, 1951, by C. R. Humphreys, may be used in place of the glass fabric in the examples.

An important use of the products of this invention is cable wrapping where it is desired to hold the cable wrap in place before it is fused in the form of an integral sheath by means of an adhesive, wherein the adhesive is volatilized without leaving any substantial residue during the fusion of the cable wrap. Other uses which do not require the volatilization of the polyisobutylene involve tank linings where a polytetrafluoroethylene sheet in the form of a coated glass fabric or unsupported film with a polyisobutylene adhesive on one side is adhered to a large area at room temperature to provide a corrosion resistant and anti-stick surface.

The bond strength between the polyisobutylene and the polytetrafluoroethylene and between the polyisobutylene and other surfaces for many applications need not be of the high order normally required for permanent adhesives and cements. It need only be great enough to hold the polytetrafluoroethylene in place to allow for manipulation and handling of the laminate without the polytetrafluoroethylene becoming displaced.

It is apparent that many widely different embodiments of this invention may be made without departing from the spirit and scope thereof and, therefore, it is not intended to be limited except as indicated in the appended claims.

I claim:

1. Polytetrafluoroethylene sheet with a pressure sensitive adhesive coating on one side, the adhesive component of said coating consisting essentially of a homopolymer of isobutylene, said adhesive having a bond strength to polytetrafluoroethylene corresponding to at least 2.5 pounds per strip one inch wide.

2. Product of claim 1 in which said sheet is an unsupported film of polytetrafluoroethylene.

3. Product of claim 1 in which said sheet is a polytetrafluoroethylene coated fabric.

4. Product of claim 3 in which said fabric is glass fabric.

5. The process of preparing a pressure sensitive adhesive sheet material comprising preparing a sheet of polytetrafluoroethylene, applying to one side of said sheet a solution of an adhesive coating material containing a volatile solvent, the adhesive component of said coating consisting essentially of a homopolymer of isobutylene, and evaporating said solvent, said adhesive having a bond strength to polytetrafluoroethylene corresponding to at least 2.5 pounds per strip one inch wide.

6. The process of claim 5 in which the sheet of polytetrafluoroethylene is in the form of an unsupported film.

7. The process of preparing a pressure sensitive adhesive sheet material comprising dipping a heat resistant fabric in an aqueous dispersion of polytetrafluoroethylene, removing the water from the dispersion deposited in and on both sides of said fabric, applying to one side of said treated fabric a solution of an adhesive coating material containing a volatile solvent, the adhesive component of said coating consisting essentially of a homopolymer of isobutylene, and evaporating said solvent, said adhesive having a bond strength to polytetrafluoroethylene corresponding to at least 2.5 pounds per strip one inch wide.

References Cited in the file of this patent

UNITED STATES PATENTS

| | | |
|---|---|---|
| 2,462,977 | Kitchin et al. | Mar. 1, 1949 |
| 2,520,173 | Sanders | Aug. 29, 1950 |
| 2,539,329 | Sanders | Jan. 23, 1951 |
| 2,572,458 | Eustis | Oct. 23, 1951 |